United States Patent
Liu

(10) Patent No.: US 11,762,976 B2
(45) Date of Patent: Sep. 19, 2023

(54) USB MASS STORAGE DEVICE ACCESS CONTROL METHOD AND ACCESS CONTROL APPARATUS

(71) Applicant: Shenzhen Longsys Electronics Co., Ltd., Shenzhen (CN)

(72) Inventor: Geng Liu, Shenzhen (CN)

(73) Assignee: SHENZHEN LONGSYS ELECTRONICS CO., LTD., Shenzhen (CN)

( * ) Notice: Subject to any disclaimer, the term of this patent is extended or adjusted under 35 U.S.C. 154(b) by 639 days.

(21) Appl. No.: 17/017,681

(22) Filed: Sep. 11, 2020

(65) Prior Publication Data
US 2020/0410085 A1    Dec. 31, 2020

Related U.S. Application Data

(63) Continuation of application No. PCT/CN2018/104961, filed on Sep. 11, 2018.

(30) Foreign Application Priority Data

May 14, 2018 (CN) .......................... 201810456826.7

(51) Int. Cl.
  *G06F 21/44* (2013.01)
  *G06F 21/45* (2013.01)
  (Continued)

(52) U.S. Cl.
  CPC .......... *G06F 21/44* (2013.01); *G06F 13/1668* (2013.01); *G06F 13/4282* (2013.01);
  (Continued)

(58) Field of Classification Search
  CPC .. G06F 21/44; G06F 13/1668; G06F 13/4282; G06F 21/45; G06F 2213/0042; G06F 2221/2141
  (Continued)

(56) References Cited

U.S. PATENT DOCUMENTS

| | | | |
|---|---|---|---|
| 7,549,161 B2* | 6/2009 | Poo | G06F 21/45 726/28 |
| 7,870,302 B2* | 1/2011 | Huang | G06F 13/385 710/15 |

(Continued)

FOREIGN PATENT DOCUMENTS

| | | |
|---|---|---|
| CN | 101097551 A | 1/2008 |
| CN | 101228516 A | 7/2008 |

(Continued)

OTHER PUBLICATIONS

Chinese First Office Action,Chinese Application No. 201810456826.7, dated Nov. 5, 2019 (13 pages).

(Continued)

*Primary Examiner* — Thanh T Le

(57) ABSTRACT

A USB mass storage device access control method and access control apparatus, a terminal device, and a computer readable storage medium. The access control method includes: in response to detecting that a USB mass storage device is inserted into a macOS, completing matching between an application and the USB mass storage device; controlling the macOS to release an access control permission for the USB mass storage device; and controlling the application to obtain the access control permission for the USB mass storage device. The solution can solve the problem in the prior art that an application cannot be controlled to implement, on a macOS, access control over a USB mass storage device.

14 Claims, 4 Drawing Sheets

(51) Int. Cl.
*G06F 13/16* (2006.01)
*G06F 13/42* (2006.01)

(52) U.S. Cl.
CPC ...... *G06F 21/45* (2013.01); *G06F 2213/0042* (2013.01); *G06F 2221/2141* (2013.01)

(58) Field of Classification Search
USPC .......................................................... 726/18
See application file for complete search history.

(56) References Cited

U.S. PATENT DOCUMENTS

| | | | | |
|---|---|---|---|---|
| 7,970,974 B2* | 6/2011 | Chen | ..................... | G06F 13/385 |
| | | | | 710/10 |
| 2009/0222814 A1* | 9/2009 | Astrand | .............. | G06F 9/45537 |
| | | | | 718/1 |
| 2010/0174834 A1* | 7/2010 | Lowe | ......................... | G06F 8/60 |
| | | | | 710/10 |
| 2011/0038005 A1* | 2/2011 | Ochiai | ............... | H04N 1/00938 |
| | | | | 358/1.15 |
| 2011/0125937 A1* | 5/2011 | Ito | ...................... | H04N 1/00241 |
| | | | | 710/36 |
| 2011/0160875 A1* | 6/2011 | Taguchi | ................... | G06F 9/485 |
| | | | | 700/17 |
| 2012/0210027 A1* | 8/2012 | Intrater | ................... | G06F 3/061 |
| | | | | 710/74 |
| 2013/0227177 A1 | 8/2013 | Cho | | |
| 2014/0075169 A1* | 3/2014 | Andrews | ............... | G06F 9/4416 |
| | | | | 713/2 |
| 2014/0337558 A1* | 11/2014 | Powers | .................... | G06F 13/42 |
| | | | | 710/313 |
| 2014/0366105 A1* | 12/2014 | Bradley | ................. | H04L 63/083 |
| | | | | 726/5 |
| 2016/0232119 A1* | 8/2016 | Knutson | .............. | G06F 13/1663 |
| 2018/0060251 A1* | 3/2018 | You | ...................... | G06F 13/4295 |
| 2020/0218681 A1* | 7/2020 | Yu | ........................ | G06F 13/4282 |

FOREIGN PATENT DOCUMENTS

| | | |
|---|---|---|
| CN | 101266590 A | 9/2008 |
| CN | 102043751 A | 5/2011 |
| CN | 103577231 A | 2/2014 |
| CN | 106126446 A | 11/2016 |

OTHER PUBLICATIONS

International Search Report, Application No. PCT/CN2018/104961, dated Feb. 14, 2019 (7 pages).
Chinese Second Office Action, Chinese Application No. 201810456826.7, dated Mar. 19, 2020 (9 pages).

* cited by examiner

USB MASS STORAGE DEVICE ACCESS CONTROL METHOD AND ACCESS CONTROL APPARATUS

CROSS-REFERENCE TO RELATED APPLICATIONS

The present disclosure is a continuation-application of International (PCT) Patent Application No. PCT/CN2018/104961 filed on Sep. 11, 2018, which claims a foreign priority of Chinese Patent Application No. 201810456826.7, with the title of "USB MASS STORAGE DEVICE ACCESS CONTROL METHOD AND ACCESS CONTROL APPARATUS", filed on May 14, 2018, the entire contents of which are hereby incorporated by reference in their entireties.

TECHNICAL FIELD

The present disclosure belongs to the technical field of safe storage, and in particular, to a USB mass storage device access control method, an access control apparatus, a terminal device, and a computer readable storage medium.

BACKGROUND

Universal serial bus mass storage devices (USB mass storage devices) generally refer to U-disks, mobile hardware disks, secure digital memory cards (SD cards), and so on, which are connected to computers through USB interfaces. The prior art generally controls applications to implement access control for USB mass storage devices in Windows operating systems. However, macOS is an operating system run in the Apple Macintosh computer series. Because of the particularity of macOS, access control permissions of USB mass storage devices inserted in macOS are locked by macOS, and therefore unable to control applications to implement access control for USB mass storage devices in macOS. For example, if a USB mass storage device is a fingerprint U-disk, when a user of macOS uses a new fingerprint U-disk, it is required to first complete operations such as fingerprint recording, modification, deletion, and so on in a Windows system, such that the fingerprint U-disk can be used in macOS, while it is unable to complete operations such as fingerprint recording, modification, deletion, and so on in macOS.

Therefore, a new technical solution to solve the above technical problem is required.

SUMMARY OF THE DISCLOSURE

In view of this, the present disclosure provides a USB mass storage device access control method, an access control apparatus, a terminal device, and a computer readable storage medium, so as to solve the problem in the prior art that an application cannot be controlled to implement, on a macOS, access control over a USB mass storage device.

A first aspect of the present disclosure provides a USB mass storage device access control method, wherein the access control method comprises: in response to detecting that a USB mass storage device is inserted into a macOS, completing matching between an application and the USB mass storage device; controlling the macOS to release an access control permission for the USB mass storage device; and controlling the application to obtain the access control permission for the USB mass storage device.

A second aspect of the present disclosure provides a terminal device comprising a memory and a processor coupled with the memory, wherein the memory is configured to store a computer program being executable in the processor, and the processor is configured to execute the computer program to implement a USB mass storage device access control method according to the above first aspect.

A third aspect of the present disclosure provides a computer readable storage medium, wherein the computer readable storage medium stores a computer program, and the computer program, when being executed by a processor, implements a USB mass storage device access control method according to the above first aspect.

Compared with the prior art, advantageous effect of the present disclosure is that: in the present disclosure, when it is detected that a USB mass storage device is inserted into a macOS, matching between an application and the USB mass storage device is completed; the macOS is controlled to release an access control permission for the USB mass storage device; and the application is controlled to obtain the access control permission for the USB mass storage device. In the present disclosure, by controlling the macOS to release an access control permission for the USB mass storage device, and enabling the application to obtain the access control permission for the USB mass storage device, the application can thus be controlled to implement access control for the USB mass storage device on the macOS, while it is not required to first perform access control in a Windows system, so that access control efficiency for the USB mass storage device is improved.

BRIEF DESCRIPTION OF THE DRAWINGS

In order to describe technical solutions of embodiments of the present disclosure more clearly, drawings required being used in description of the embodiments and the prior art will be simply introduced below. Obviously, the drawings in the following description are merely some embodiments of the present disclosure. For one of ordinary skill in the art, it is also possible to obtain other drawings according to these drawings without paying any creative work.

DETAILED DESCRIPTION

Figure 1:
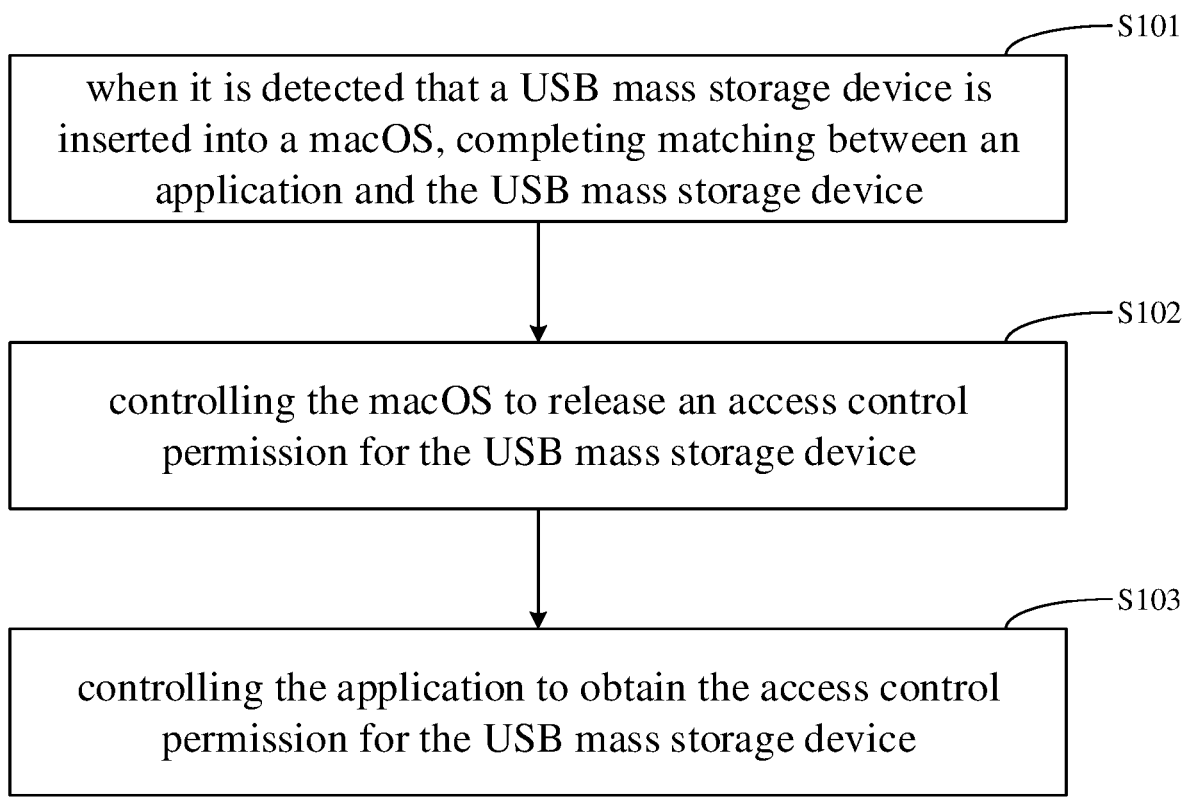
FIG. 1 is a schematic view of an implementing flow of a USB mass storage device access control method provided by a first embodiment of the present disclosure.

In the following description, for the purpose of illustration rather than limitation, specific details such as a specific system structure and technology are proposed for thorough understanding of the embodiments of the present disclosure. However, it should be clear to those skilled in the art that the present disclosure can also be implemented in other embodiments without these specific details. In other cases, detailed descriptions of well-known systems, devices, circuits, and methods are omitted so as to avoid unnecessary details from obstructing the description of the present disclosure.

It should be understood that the term "comprising", when being used in this specification and appended claims, indicates the existence of the described features, wholes, steps, operations, elements and/or components, but does not exclude the existence or addition of one or more other features, wholes, steps, operations, elements, components and/or collection thereof.

It should also be understood that the terms used in this specification of the present disclosure are only for the purpose of describing specific embodiments and are not intended to limit the present disclosure. As used in the specification and the appended claims of the present disclosure, unless the context clearly indicates otherwise, the singular forms "a", "an" and "the" are intended to include plural forms.

It should be further understood that the term "and/or" used in the specification and appended claims of the present disclosure refers to any combination and all possible combinations of one or more of the associated listed items, and includes these combinations.

As used in this specification and the appended claims, the term "if" can be interpreted as "when" or "once" or "in response to determination" or "in response to detection" depending on the context. Similarly, the phrase "if determining" or "if detecting [described conditions or events]" can be interpreted as meaning "once determining" or "in response to determination" or "once detecting [described conditions or events]" or "in response to detection of [described conditions or events]" depending on the context.

It should be understood that the value of the sequence number of each step in this embodiment does not mean the order of execution. The execution sequence of each process should be determined according to its function and internal logic, and should not constitute any limitation to the implementation process of the embodiment of the present disclosure.

According to a first aspect of the present disclosure, a USB mass storage device access control method is provided, wherein the access control method comprises: in response to detecting that a USB mass storage device is inserted into a macOS, completing matching between an application and the USB mass storage device; controlling the macOS to release an access control permission for the USB mass storage device; and controlling the application to obtain the access control permission for the USB mass storage device.

In some embodiments, after the controlling the macOS to release an access control permission for the USB mass storage device, the method further comprises: performing disconnection and USB bus reset for the USB mass storage device.

In some embodiments, the in response to detecting that a USB mass storage device is inserted into a macOS, completing matching between an application and the USB mass storage device comprises: in response to detecting that a USB mass storage device is inserted into a macOS, sending, by the application, a descriptor information acquisition command including a first special field to the USB mass storage device; and in response to detecting receiving descriptor information including a second special field, completing matching between the application and the USB mass storage device; wherein, the descriptor information including a second special field refers to information returned by the USB mass storage device after receiving the descriptor information acquisition command including a first special field.

In some embodiments, the in response to detecting receiving descriptor information including a second special field, completing matching between the application and the USB mass storage device comprises: in response to receiving, by the USB mass storage device, the descriptor information acquisition command including a first special field, returning, by the USB mass storage device, description information of the USB mass storage device to the application, wherein the description information includes the second special field; and in response to receiving, by the application, the descriptor information including a second special field, completing matching between the application and the USB mass storage device.

In some embodiments, before the controlling the macOS to release an access control permission for the USB mass storage device, the method further comprises: by amending the second special field, indicating the USB mass storage device as a non-USB mass storage device to the macOS.

In some embodiments, wherein the first special field differs from the second special field.

In some embodiments, the controlling the application to obtain the access control permission for the USB mass storage device comprises: controlling the application to perform access control for the USB mass storage device through a bulk-only transport command.

According to a second aspect of the present disclosure, a terminal device is provided, wherein the terminal device comprises a memory and a processor coupled with the memory, wherein the memory is configured to store a computer program being executable in the processor, and the processor is configured to execute the computer program to implement a USB mass storage device access control method comprising: in response to detecting that a USB mass storage device is inserted into a macOS, completing matching between an application and the USB mass storage device; controlling the macOS to release an access control permission for the USB mass storage device; and controlling the application to obtain the access control permission for the USB mass storage device.

In some embodiments, the in response to detecting that a USB mass storage device is inserted into a macOS, completing matching between an application and the USB mass storage device comprises: in response to detecting that a USB mass storage device is inserted into a macOS, sending, by the application, a descriptor information acquisition command including a first special field to the USB mass storage device; and in response to detecting receiving descriptor information including a second special field, completing matching between the application and the USB mass storage device; wherein, the descriptor information including a second special field refers to information returned by the USB mass storage device after receiving the descriptor information acquisition command including a first special field.

In some embodiments, the in response to detecting receiving descriptor information including a second special field, completing matching between the application and the USB mass storage device comprises: in response to receiving, by the USB mass storage device, the descriptor information acquisition command including a first special field, returning, by the USB mass storage device, description information of the USB mass storage device to the application, wherein the description information includes the second special field; and in response to receiving, by the application, the descriptor information including a second special field, completing matching between the application and the USB mass storage device.

In some embodiments, before the controlling the macOS to release an access control permission for the USB mass storage device, the method further comprises: by amending the second special field, indicating the USB mass storage device as a non-USB mass storage device to the macOS.

In some embodiments, the first special field differs from the second special field.

In some embodiments, the controlling the application to obtain the access control permission for the USB mass storage device comprises: controlling the application to perform access control for the USB mass storage device through a bulk-only transport command.

According to a third aspect of the present disclosure, a computer readable storage medium is provided, wherein the computer readable storage medium stores a computer program, and the computer program, when being executed by a processor, implements a USB mass storage device access control method comprising: in response to detecting that a USB mass storage device is inserted into a macOS, completing matching between an application and the USB mass storage device; controlling the macOS to release an access control permission for the USB mass storage device; and controlling the application to obtain the access control permission for the USB mass storage device.

In some embodiments, after the controlling the macOS to release an access control permission for the USB mass storage device, the method further comprises: performing disconnection and USB bus reset for the USB mass storage device.

In some embodiments, the in response to detecting that a USB mass storage device is inserted into a macOS, completing matching between an application and the USB mass storage device comprises: in response to detecting that a USB mass storage device is inserted into a macOS, sending, by the application, a descriptor information acquisition command including a first special field to the USB mass storage device; and in response to detecting receiving descriptor information including a second special field, completing matching between the application and the USB mass storage device; wherein, the descriptor information including a second special field refers to information returned by the USB mass storage device after receiving the descriptor information acquisition command including a first special field.

In some embodiments, the in response to detecting receiving descriptor information including a second special field, completing matching between the application and the USB mass storage device comprises: in response to receiving, by the USB mass storage device, the descriptor information acquisition command including a first special field, returning, by the USB mass storage device, description information of the USB mass storage device to the application, wherein the description information includes the second special field; and in response to receiving, by the application, the descriptor information including a second special field, completing matching between the application and the USB mass storage device.

In some embodiments, before the controlling the macOS to release an access control permission for the USB mass storage device, the method further comprises: by amending the second special field, indicating the USB mass storage device as a non-USB mass storage device to the macOS.

In some embodiments, the controlling the application to obtain the access control permission for the USB mass storage device comprises: controlling the application to perform access control for the USB mass storage device through a bulk-only transport command.

In order to illustrate the technical solution of the present disclosure, specific embodiments are used to illustrate below.

FIG. 1 is a schematic view of an implementing flow of a USB mass storage device access control method provided by a first embodiment of the present disclosure. The USB mass storage device access control method can be applied in a terminal device running macOS (e.g., Apple Macintosh computer series). As shown in the figure, the USB mass storage device access control method can comprise the following operations.

Operation S101, when it is detected that a USB mass storage device is inserted into a macOS, completing matching between an application and the USB mass storage device.

In this embodiment of the present disclosure, a USB mass storage device requiring access control can be inserted into a terminal device running macOS; when detecting that the USB mass storage device is inserted, matching between an application and the USB mass storage device can be completed. In this embodiment the application can refer to a third party application in the terminal device configured to access control the USB mass storage device.

Alternatively, the when it is detected that a USB mass storage device is inserted into a macOS, completing matching between an application and the USB mass storage device comprises: when it is detected that a USB mass storage device is inserted into a macOS, making the application send a descriptor information acquisition command including a special field to the USB mass storage device; and when descriptor information including a special field is received, matching between the application and the USB mass storage device is completed. In this embodiment, the descriptor information including a special field refers to information returned by the USB mass storage device after receiving the descriptor information acquisition command including a special field.

In this embodiment of the present disclosure, when it is detected that a USB mass storage device is inserted into a macOS, the application can be controlled to send a descriptor information acquisition command (that is, a get descriptor command, this command is a standard USB request command used to return descriptor information of the USB mass storage device) to the USB mass storage device. The descriptor information acquisition command includes a special field, the USB mass storage device, after receiving the descriptor information acquisition command including a special field, returns description information of the USB mass storage device to the application; the description information includes a special field, when the application receives the descriptor information including a special field, matching between the application and the USB mass storage device is completed. In this embodiment, the special field in the descriptor information can indicate the USB mass storage device as a non-USB mass storage device to the macOS. Since access control permission for the USB mass storage device inserted in the macOS is locked by the macOS, if the USB mass storage device is "amended into a non-USB mass storage device" through the special field, in other words, if the USB mass storage device is indicated as a non-USB mass storage device to the mac OS by amending the special field in the descriptor information, it is possible to control the macOS not to lock access control permission for the USB mass storage device.

It should be noted that the special field in the descriptor information acquisition command and the special field in the descriptor information are different fields. In order to distinguish the two special fields, it is possible to define the special field in the descriptor information acquisition command as a first special field, and define the special field in the descriptor information as a second special field, which is not limited herein.

Exemplarily, a descriptor information acquisition command and descriptor information in the prior art are respectively as follows.

Descriptor information acquisition command: 80 06 00 01 00 00 12 00

Descriptor information: 12 01 00 02 00 00 00 40 44 86 05 80 00 01 01 02 00 01

A descriptor information acquisition command (i.e., the descriptor information acquisition command including a special field) and descriptor information (i.e., the descriptor information including a special field) in this embodiment of the present disclosure are as follows.

Descriptor information acquisition command including a special field: 80 06 00 01 5A 5A 12 00

Descriptor information including a special field: 12 01 00 02 00 00 00 04 44 86 05 80 00 01 FF 02 00 01

In this embodiment, 5A 5A is a special field of manufacturer information, and can be defines as non-zero according to requirements. The special field in the descriptor information is the fifteenth byte, which is amended into FF, and can indicate a device returning the descriptor information as a non-USB mass storage device, that is, it is possible to "amend the USB mass storage device into a non-USB mass storage device through the special field", in other words, indicate the USB mass storage device as a non-USB mass storage device to the mac OS by amending the special field. Other bytes (bytes except the fifteenth byte) in the descriptor information can be defined as manufacturer identification information according to requirements.

Operation S102, controlling the macOS to release an access control permission for the USB mass storage device.

In this embodiment of the present disclosure, after completing matching between the application and the USB mass storage device, it is realized that "the USB mass storage device is amended into a non-USB mass storage device", in other words, the USB mass storage device is indicated as a non-USB mass storage device to the macOS. At this time, it is possible to control the macOS to release access control permission for the USB mass storage device, that is, control the macOS not to lock the access control permission for the USB mass storage device. In this embodiment, the access control permission for the USB mass storage device can refer to permissions of accessing and controlling the USB mass storage device, for example, permissions of performing operations, such as fingerprint recording, amending, deleting, and so on, on a fingerprint U-disk.

Operation S103, controlling the application to obtain the access control permission for the USB mass storage device.

In this embodiment of the present disclosure, after the macOS releases the access control permission for the USB mass storage device, the application can obtain the access control permission for the USB mass storage device, so as to achieve performing access control for the USB mass storage device on the macOS.

Alternatively, the controlling the application to obtain the access control permission for the USB mass storage device comprises: the application is controlled to perform access control for the USB mass storage device through a bulk-only transport command.

In this embodiment of the present disclosure, in order to implement access control for the USB mass storage device, the application can perform access control for the USB mass storage device through customized bulk-only transport commands. In this embodiment, buck-only transport is a kind of block storage class protocol made by USB organize aiming at USB mass storage device, this protocol transmit data, commands, states, and so on using bulk endpoints.

In this embodiment of the present disclosure, by controlling the macOS to release an access control permission for the USB mass storage device, and enabling the application to obtain the access control permission for the USB mass storage device, the application can thus be controlled to implement access control for the USB mass storage device on the macOS, while it is not required to first perform access control in a Windows system, so that access control efficiency for the USB mass storage device is improved.

Figure 2:
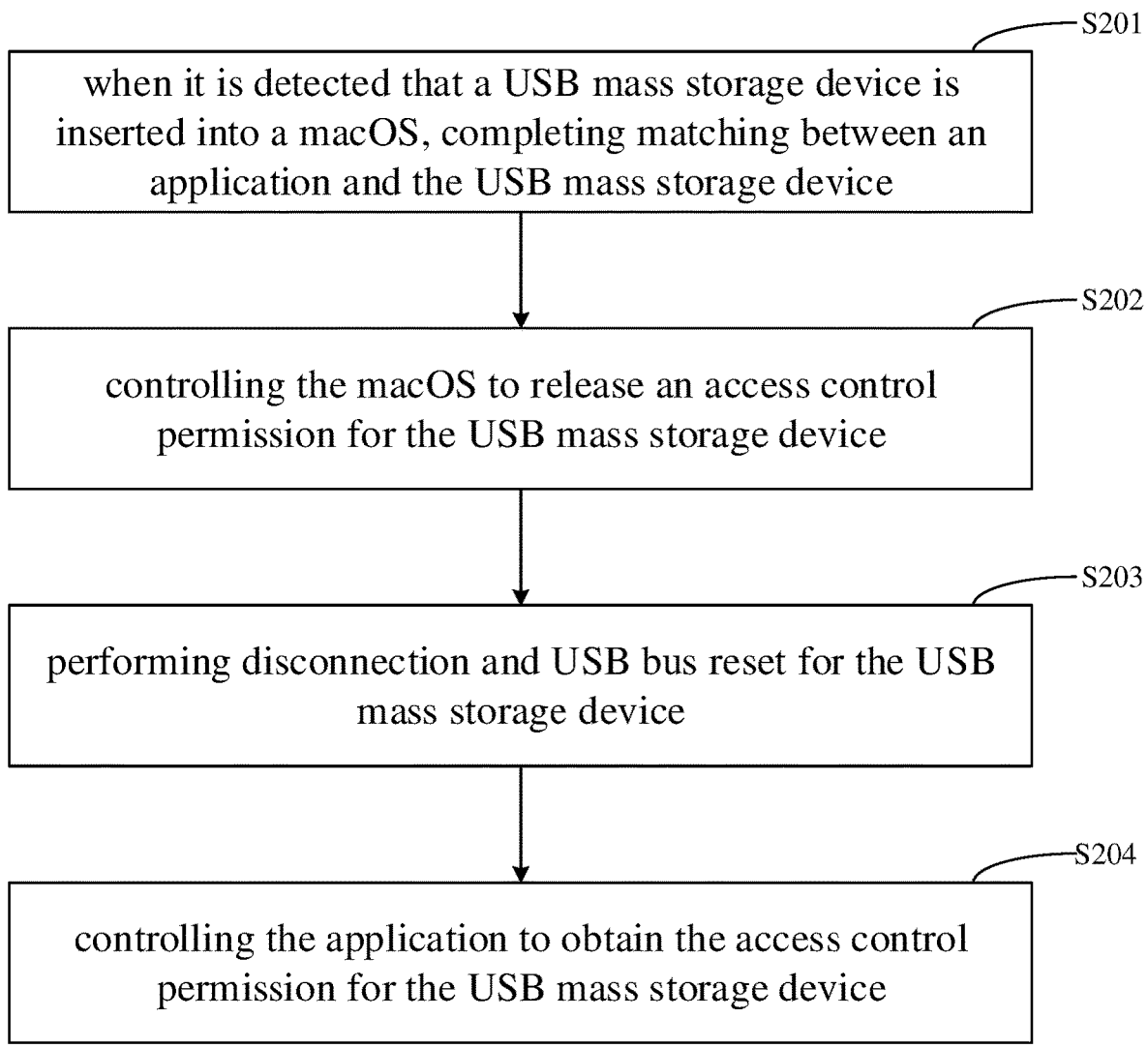
FIG. 2 is a schematic view of an implementing flow of a USB mass storage device access control method provided by a second embodiment of the present disclosure.

FIG. 2 is a schematic view of an implementing flow of a USB mass storage device access control method provided by a second embodiment of the present disclosure. The USB mass storage device access control method can be applied in a terminal device running macOS (e.g., Apple Macintosh computer series). As shown in the figure, the USB mass storage device access control method can comprise the following operations.

Operation S201, when it is detected that a USB mass storage device is inserted into a macOS, completing matching between an application and the USB mass storage device.

This operation is identical to the operation S101, and can specifically refer to the relative description of the operation S101, which is not repeated here.

Operation 202, controlling the macOS to release an access control permission for the USB mass storage device.

This operation is identical to the operation S102, and can specifically refer to the relative description of the operation S102, which is not repeated here.

Operation S203, performing disconnection and USB bus reset for the USB mass storage device.

In this embodiment of the present disclosure, after the macOS releases the access control permission for the USB mass storage device, it is unable to perform access control for the USB mass storage device. In order to realize access control for the USB mass storage device, at this time, the terminal device can perform soft disconnection and USB bus reset for the USB mass storage device, so as to obtain the descriptor information of the USB mass storage device by re-enumeration, that is, re-identify the USB mass storage device and establish a corresponding data link channel.

Operation S204, controlling the application to obtain the access control permission for the USB mass storage device.

This operation is identical to the operation S103, and can specifically refer to the relative description of the operation S103, which is not repeated here.

This embodiment of the present disclosure adds "performing disconnection and USB bus reset for the USB mass storage device" on the basis of the first embodiment, thus it can be ensured that after the macOS releases the access control permission for the USB mass storage device, the USB mass storage device is re-identified, and the application is controlled to obtain the access control permission for the USB mass storage device.

Figure 3:
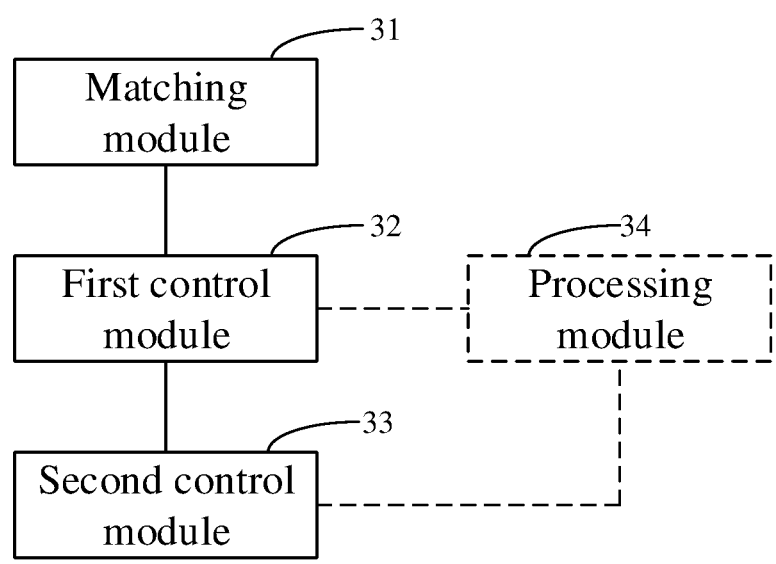
FIG. 3 is a schematic view of a USB mass storage device access control device provided by a third embodiment of the present disclosure.

FIG. 3 is a schematic view of a USB mass storage device access control device provided by a third embodiment of the present disclosure. For ease of illustration, only parts relating to this embodiment of the present disclosure are shown.

The access control device comprises: a matching module 31 configured to: when it is detected that a USB mass storage device is inserted into a macOS, complete matching between an application and the USB mass storage device; a first control module 32 configured to control the macOS to release an access control permission for the USB mass storage device; and a second control module 33 configured to control the application to obtain the access control permission for the USB mass storage device.

Alternatively, the access control device further comprises: a processing module 34 configured to perform disconnection and USB bus reset for the USB mass storage device.

Alternatively, the matching module 31 comprises a command sending unit configured to: when it is detected that a USB mass storage device is inserted into a macOS, make the application send a descriptor information acquisition command including a special field to the USB mass storage device; and a matching unit configured to: when descriptor information including a special field is received, complete matching between the application and the USB mass storage device; wherein, the descriptor information including a special field refers to information returned by the USB mass storage device after receiving the descriptor information acquisition command including a special field.

Alternatively, the second control module 33 is specifically configured to: control the application to perform access control for the USB mass storage device through bulk-only transport commands.

The access control device provided by this embodiment of the present disclosure can be applied in the methods of the aforesaid first embodiment and second embodiment. The details can refer to the description of the methods of the aforesaid first embodiment and second embodiment, and are not repeated here.

Figure 4:
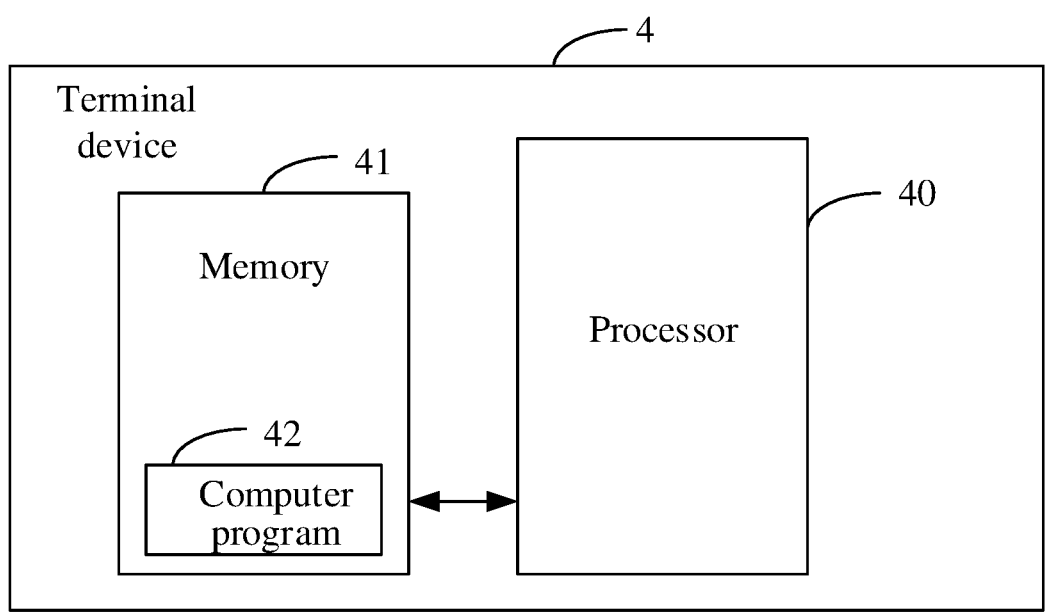
FIG. 4 is a schematic view of a terminal device provided by a fourth embodiment of the present disclosure.

FIG. 4 is a schematic view of a terminal device provided by a fourth embodiment of the present disclosure. As shown in FIG. 4, the terminal device 4 of this embodiment comprises: a processor 40, a memory 41, and a computer program 42 stored in the memory 41 and being executable in the processor 40. The processor 40, when executing the computer program 42, implements the operations in the aforesaid embodiments of the USB mass storage device access control methods, such as the operations S101 to S103 shown in FIG. 1. Alternatively, the processor 40, when executing the computer program 42, implements the functions of the modules/units in the embodiment of the device, such as the functions of the modules 31-34 shown in FIG. 3.

Exemplarily, the computer program 42 can be divided into one or more nodules/units, the one or more modules/units are stored in the memory 41, and are executed by the processor 40 to complete the present disclosure. The one or more modules/units can be a series of computer program instruction segments being capable of completing certain functions, these instruction segments are configured to describe an executing process of the computer program 42 in the terminal device 4. For example, the computer program 42 can be divided into a matching module, a first control module, a second control module, and a processing module, and specific functions of these modules are as follows.

The matching module is configured to: when it is detected that a USB mass storage device is inserted into a macOS, complete matching between an application and the USB mass storage device;

The first control module is configured to control the macOS to release an access control permission for the USB mass storage device.

The second control module is configured to control the application to obtain the access control permission for the USB mass storage device.

Alternatively, the processing module is configured to perform disconnection and USB bus reset for the USB mass storage device.

Alternatively, the matching module comprises: a command sending unit configured to: when it is detected that a USB mass storage device is inserted into a macOS, make the application send a descriptor information acquisition command including a special field to the USB mass storage device; and a matching unit configured to: when descriptor information including a special field is received, complete matching between the application and the USB mass storage device; wherein, the descriptor information including a special field refers to information returned by the USB mass storage device after receiving the descriptor information acquisition command including a special field.

Alternatively, the second control module is specifically configured to: control the application to perform access control for the USB mass storage device through bulk-only transport commands.

The terminal device 4 can be computing device such as a desktop computer, a notebook computer, a personal digital assistant, a cloud server, and so on. The terminal device can comprise, but is not limited to, the processor 40 and the memory 41. One of ordinary skill in the art can understand that FIG. 4 is only an example of the terminal device 4 and does not form any limitation to the terminal device 4. The terminal device 4 can comprise more or less parts than shown in the figures, or combine some parts, or comprise different parts, for example, the terminal device can further comprise an input/output device, a network access device, a bus, etc.

It should be understood that in the embodiments of the present disclosure, the processor 40 can be a central processing unit (CPU); the processor can also be other universal processors, digital signal processors (DSP), application specific integrated circuits (ASIC), field-programmable gate arrays (FPGA), or other programmable logic devices, discrete gates or transistor logic devices, discrete hardware components, and so on. The universal processor can be a microprocessor, or the processor can also be any conventional processor, etc.

The processor 40 can be a central processing unit (CPU), and can also be other universal processors, digital signal processors (DSP), application specific integrated circuits (ASIC), field-programmable gate arrays (FPGA), or other programmable logic devices, discrete gates or transistor logic devices, discrete hardware components, and so on. The universal processor can be a microprocessor, or the processor can also be any conventional processor, etc.

The memory 41 can be an internal storage unit of the terminal device 4, for example, a hard disk or a memory module of the terminal device. The memory 41 can also be an external storage device for the terminal device 4, for example, a plug-in hard disk, a smart media card (SMC), an SD card, a flash card, or the like equipped for the terminal device 4. Furthermore, the memory 41 can also include not only an internal storage unit of the terminal device 4 but also an external storage device. The memory 41 is used to store the computer program and other programs and data required by the terminal device. The memory 41 can also be used to temporarily store data that has been output or will be output.

Those skilled in the art can clearly understand that only the division of the above-mentioned functional units and modules is illustrated as an example for convenience and conciseness of the description. In practical applications, according to requirements, the above-mentioned functions can be allocated to different functional units and modules to complete. That is, the internal structure of the device is divided into different functional units or modules to complete all or some of the functions described above. The functional units and modules in the embodiments can be integrated into one processing unit, or each unit can physically exist alone, or two or more units can be integrated into one unit. The above-mentioned integrated units can be implemented in the form of hardware, and can also be implemented in the form of software functional units. In addition, specific names of the functional units and modules are only intended to facilitate distinguishing each other, while are not intended to limit the protection scope of the present application. For specific working processes of the units and modules in the foregoing system, reference may be made to the corresponding processes in the foregoing method embodiments, which are not repeated here.

In the above-mentioned embodiments, the description of each embodiment has its own emphasis. For parts that are not described in detail or recorded in a certain embodiment, reference may be made to related descriptions of other embodiments.

One of ordinary skill in the art can be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professional technicians can use different methods for each specific application to implement the described functions, but such implementation should not be considered as going beyond the scope of the present disclosure.

In the embodiments provided by the present disclosure, it should be understood that the disclosed devices and methods may be implemented in other ways. For example, the device embodiments described above are merely illustrative. For example, the division of the modules or units is only a logical function division. In actual implementation, there may be other division methods, for example, multiple units or components may be combined or may be integrated into another system, or some features can be ignored or not implemented. In addition, the displayed or discussed mutual coupling, or direct coupling or communication connection, may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or may also be distributed on multiple network units. Some or all of the units may be selected according to actual requirements to achieve the objectives of the solutions of the embodiments.

In addition, the functional units in the various embodiments of the present disclosure may be integrated into one processing unit, or each unit may physically exist alone, or two or more units may be integrated into one unit. The above-mentioned integrated unit can be implemented in the form of hardware, and can also be implemented in the form of software functional units.

If the integrated modules/units are implemented in the form of software functional units and sold or used as independent products, they can be stored in a computer readable storage medium. Based on such understanding, all or some of the processes of the methods in the above-mentioned embodiments implemented by the present disclosure can also be completed by instructing relevant hardware through a computer program. The computer program can be stored in a computer-readable storage medium. When the computer program is executed by a processor, the steps of the foregoing method embodiments can be implemented. Wherein, the computer program includes computer program codes, and the computer program codes may be in the form of source codes, object codes, executable files, or some intermediate forms, etc. The computer readable medium may include: any entity or device capable of carrying the computer program codes, recording mediums, U-disks, mobile hard disks, magnetic disks, optical disks, computer memories, read-only memories (ROM, Read-Only Memory), random access memories (RAM, Random Access Memory), electrical carrier signals, telecommunications signals, software distribution media, and so on. It should be noted that the content contained in the computer readable medium can be appropriately added or deleted in accordance with the requirements of the legislation and patent practice in a jurisdiction. For example, in some jurisdictions, according to the legislation and patent practice, the computer readable medium does not include electrical carrier signals and telecommunication signals.

The above-mentioned embodiments are only intended to illustrate but not to limit the technical solutions of the present disclosure. Although the present disclosure has been described in detail with reference to the foregoing embodiments, those of ordinary skill in the art should understand that: the technical solutions recorded in the foregoing embodiments can still be modified, or some of the technical features thereof can be equivalently replaced; these modifications or replacements do not cause the essence of corresponding technical solutions to deviate from the spirit and scopes of the technical solutions of the embodiments of the present disclosure, and should be all included in the protection scope of the present disclosure.

The above are implementation manners of embodiments of the present disclosure. It should be noted that for one of ordinary skill in the art, various improvements and embellishments can also be made without departing from the principle of embodiments of the present disclosure, and these improvements and embellishments are also considered as the protection scope of the present disclosure.

What is claimed is:

1. A USB mass storage device access control method, comprising:
   in response to detecting that a USB mass storage device is inserted into a macOS, completing matching between an application and the USB mass storage device;
   controlling the macOS to release an access control permission for the USB mass storage device; and
   controlling the application to obtain the access control permission for the USB mass storage device;
   wherein the in response to detecting that a USB mass storage device is inserted into a macOS, completing matching between the application and the USB mass storage device comprises:
   in response to detecting that the USB mass storage device is inserted into the macOS, sending, by the application, a descriptor information acquisition command including a first special field to the USB mass storage device;
   in response to detecting receiving descriptor information including a second special field, completing matching between the application and the USB mass storage device; wherein, the descriptor information including a second special field refers to information returned by the USB mass storage device after receiving the descriptor information acquisition command including a first special field; and before the controlling the macOS to release the access control permission for the USB mass storage device, the method further comprises:

amending the second special field, indicating the USB mass storage device as a non-USB mass storage device to the macOS.

2. The method according to claim 1, wherein, after the controlling the macOS to release an access control permission for the USB mass storage device, the method further comprises:

performing disconnection and USB bus reset for the USB mass storage device.

3. The method according to claim 1, wherein, the in response to detecting receiving descriptor information including a second special field, completing matching between the application and the USB mass storage device comprises:

in response to receiving, by the USB mass storage device, the descriptor information acquisition command including a first special field, returning, by the USB mass storage device, description information of the USB mass storage device to the application, wherein the description information includes the second special field; and in response to receiving, by the application, the descriptor information including a second special field, completing matching between the application and the USB mass storage device.

4. The method according to claim 1, wherein the first special field differs from the second special field.

5. The method according to claim 1, wherein, the controlling the application to obtain the access control permission for the USB mass storage device comprises:

controlling the application to perform access control for the USB mass storage device through a bulk-only transport command.

6. A terminal device comprising a memory and a processor coupled with the memory, wherein the memory is configured to store a computer program executable by the processor, and the processor is configured to execute the computer program to implement a USB mass storage device access control method comprising:

in response to detecting that a USB mass storage device is inserted into a macOS, completing matching between an application and the USB mass storage device;

controlling the macOS to release an access control permission for the USB mass storage device; and controlling the application to obtain the access control permission for the USB mass storage device;

wherein the in response to detecting that a USB mass storage device is inserted into a macOS, completing matching between the application and the USB mass storage device comprises:

in response to detecting that the USB mass storage device is inserted into the macOS, sending, by the application, a descriptor information acquisition command including a first special field to the USB mass storage device;

in response to detecting receiving descriptor information including a second special field, completing matching between the application and the USB mass storage device; wherein, the descriptor information including a second special field refers to information returned by the USB mass storage device after receiving the descriptor information acquisition command including a first special field; and before the controlling the macOS to release the access control permission for the USB mass storage device, the method further comprises:

amending the second special field, indicating the USB mass storage device as a non-USB mass storage device to the macOS.

7. The terminal device according to claim 6, wherein, the in response to detecting receiving descriptor information including a second special field, completing matching between the application and the USB mass storage device comprises:

in response to receiving, by the USB mass storage device, the descriptor information acquisition command including a first special field, returning, by the USB mass storage device, description information of the USB mass storage device to the application, wherein the description information includes the second special field; and in response to receiving, by the application, the descriptor information including a second special field, completing matching between the application and the USB mass storage device.

8. The terminal device according to claim 7, wherein the first special field differs from the second special field.

9. The terminal device according to claim 6, wherein, the controlling the application to obtain the access control permission for the USB mass storage device comprises:

controlling the application to perform access control for the USB mass storage device through a bulk-only transport command.

10. A non-transitory computer readable storage medium, wherein the non-transitory computer readable storage medium stores a computer program, and the computer program, when executed by a processor, implements a USB mass storage device access control method comprising:

in response to detecting that a USB mass storage device is inserted into a macOS, completing matching between an application and the USB mass storage device;

controlling the macOS to release an access control permission for the USB mass storage device; and controlling the application to obtain the access control permission for the USB mass storage device;

wherein the in response to detecting that a USB mass storage device is inserted into a macOS, completing matching between the application and the USB mass storage device comprises:

in response to detecting that the USB mass storage device is inserted into the macOS, sending, by the application, a descriptor information acquisition command including a first special field to the USB mass storage device;

in response to detecting receiving descriptor information including a second special field, completing matching between the application and the USB mass storage device; wherein, the descriptor information including a second special field refers to information returned by the USB mass storage device after receiving the descriptor information acquisition command including a first special field; and before the controlling the macOS to release the access control permission for the USB mass storage device, the method further comprises:

amending the second special field, indicating the USB mass storage device as a non-USB mass storage device to the macOS.

11. The non-transitory computer readable storage medium according to claim 10, wherein, after the controlling the macOS to release an access control permission for the USB mass storage device, the method further comprises:
  performing disconnection and USB bus reset for the USB mass storage device.

12. The non-transitory computer readable storage medium according to claim 10, wherein, the in response to detecting receiving descriptor information including a second special field, completing matching between the application and the USB mass storage device comprises:
  in response to receiving, by the USB mass storage device, the descriptor information acquisition command including a first special field, returning, by the USB mass storage device, description information of the USB mass storage device to the application, wherein the description information includes the second special field; and
  in response to receiving, by the application, the descriptor information including a second special field, completing matching between the application and the USB mass storage device.

13. The non-transitory computer readable storage medium according to claim 10, wherein the first special field differs from the second special field.

14. The non-transitory computer readable storage medium according to claim 10, wherein, the controlling the application to obtain the access control permission for the USB mass storage device comprises:
  controlling the application to perform access control for the USB mass storage device through a bulk-only transport command.

\* \* \* \* \*